United States Patent
Bosch et al.

(10) Patent No.: US 7,580,385 B2
(45) Date of Patent: Aug. 25, 2009

(54) INTEGRATED BASE STATIONS AND A METHOD OF TRANSMITTING DATA UNITS IN A COMMUNICATIONS SYSTEM FOR MOBILE DEVICES

(75) Inventors: Peter Bosch, New Providence, NJ (US); Sape Mullender, North Plainfield, NJ (US); Girija J. Narlikar, Basking Ridge, NJ (US); Louis G. Samuel, Swindon (GB); Lakshman N. Yagati, Palo Alto, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 443 days.

(21) Appl. No.: 11/047,038

(22) Filed: Jan. 31, 2005

(65) Prior Publication Data

US 2006/0171364 A1    Aug. 3, 2006

(51) Int. Cl.
*H04Q 7/00* (2006.01)
(52) U.S. Cl. .................. 370/328; 370/310; 370/412; 455/561; 455/550.1
(58) Field of Classification Search .......... 370/328, 370/329, 469, 229, 349, 394, 398, 399, 310, 370/412; 455/561, 550.1; 709/231, 232
See application file for complete search history.

(56) References Cited

U.S. PATENT DOCUMENTS

| | | | |
|---|---|---|---|
| 6,034,962 A * | 3/2000 | Ohno et al. ............... | 370/399 |
| 6,208,620 B1 | 3/2001 | Sen et al. | |
| 6,424,629 B1 * | 7/2002 | Rubino et al. ............. | 370/241.1 |
| 7,190,680 B2 * | 3/2007 | Lim ........................... | 370/312 |
| 2002/0021698 A1 * | 2/2002 | Lee et al. .................... | 370/394 |
| 2002/0037000 A1 * | 3/2002 | Park et al. ................... | 370/349 |
| 2002/0141353 A1 * | 10/2002 | Ludwig et al. .............. | 370/254 |
| 2002/0199008 A1 * | 12/2002 | Pecen et al. ................. | 709/231 |
| 2004/0097267 A1 * | 5/2004 | Pecen et al. ................. | 455/560 |
| 2004/0114593 A1 | 6/2004 | Dick et al. | |
| 2004/0160959 A1 | 8/2004 | Balachandran | |
| 2004/0190552 A1 | 9/2004 | Kim et al. | |
| 2004/0252664 A1 * | 12/2004 | Cao et al. ................... | 370/335 |
| 2006/0114936 A1 * | 6/2006 | Paffen ......................... | 370/469 |
| 2006/0165074 A1 * | 7/2006 | Modi et al. ................. | 370/389 |

FOREIGN PATENT DOCUMENTS

| | | |
|---|---|---|
| EP | 1603359 A1 | 12/2005 |
| WO | 03047155 A1 | 6/2003 |
| WO | WO2004089028 A1 | 10/2004 |

OTHER PUBLICATIONS

"Universal Mobile Telecommunications System (UMTS); UTRA High Speed Downlink Packet Access (HSDPA); Overall Description Stage 2 (3GPP TS 25.308 version 6.3.0 Release 6); ETSI TS 125 308," Dec. 2004, ETSI Standards, European Telecommunications Standards Institute, Sophia-Antipo, FR, XP014027651, ISSN: 0000-0001.

* cited by examiner

Primary Examiner—Danh C Le

(57) ABSTRACT

Integrated base stations and a method of transmitting data units in a communications system for mobile devices. In one embodiment, an integrated base station includes a communications processor having a protocol stack configured with a media access control layer and a physical layer.

23 Claims, 3 Drawing Sheets

INTEGRATED BASE STATIONS AND A METHOD OF TRANSMITTING DATA UNITS IN A COMMUNICATIONS SYSTEM FOR MOBILE DEVICES

TECHNICAL FIELD OF THE INVENTION

The present invention is directed, in general, to communications networks, and more specifically, to an integrated base station, a communications system for mobile devices and a method of transmitting data units in a communications system for mobile devices.

BACKGROUND OF THE INVENTION

A cellular communications network typically includes a variety of communication nodes coupled by wireless or wired connections and accessed through different types of communications channels. Each of the communications nodes includes a protocol stack that processes the data transmitted and received over the communications channels. Depending on the type of communications system, the operation and configuration of the various communication nodes can differ and are often referred to by different names. Such communications systems include a Code Division Multiple Access 2000 (CDMA2000) system and Universal Mobile Telecommunications System (UMTS).

Considering UMTS as an example, a typical Universal Mobile Telecommunications System (UMTS), includes a set of collaborating components (i.e., physical machines with memory, processing capacity and networking capabilities) that collectively bridge voice circuits and Internet Protocol (IP) data packets over wired and wireless connections to mobile devices such as a cellular telephone. Generally, the mobile devices in a UMTS are referred to as User Equipment (UE). Two such components in a UMTS include a radio network controller (RNC) and a base station (Node B). In a UMTS Terrestrial Radio Access Network (UTRAN), a core network (CN), is responsible for bridging voice or data (IP) packets to a wired network, such as, a telephony or IP network. A UTRAN is subdivided into individual radio network systems (RNSs), where each RNS is controlled by an RNC. The RNC is connected to a set of Node B elements, each of which can serve one or several cells.

Each component of the UTRAN implements a part of the overall protocol stack required for peer-to-peer communication between a mobile device and the UTRAN. The required protocol stacks include a Packet Data Convergence Protocol (PDCP) that provides header compression for TCP/IP and RTP/UDP/IP packets, a Radio Link Control (RLC) that provides Acknowledged Mode (AM), Unacknowledged Mode (UM) and Transparent Mode (TM) transmissions and a Media Access Control (MAC) that provides channelization and routing. An Iub interface protocol stack between a RNC and a Node B is an example of a conventional protocol stack of a UMTS.

In a conventional UTRAN, the PDCP, RLC and a portion of the MAC layer execute in the RNC. For regular UMTS, the Node B transmits PDCP/RLC/MAC Packet Data Units (PDUs) over wireless circuits. A separate Radio Resource Control (RRC) layer controls each protocol layer and executes in the RNC.

High Speed Downlink Packet Access (HSDPA) is a UMTS Release 5 extension that allows a Node B to make independent transmission decisions based on channel conditions to a mobile device. A similar packet schedule mode for wireless transmissions in a CDMA2000 system is DO or DV of a CDMA2000 protocol stack. A MAC-layer extension that implements a High Speed scheduler for HSDPA (MAC-HS), uses a multi-dimensional vector for scheduling to optimize for bandwidth, frequency efficiency and latency. With HSDPA, the RNC has limited control on the order in which the Node B schedules the mobile device.

Additional problems associated with dividing the functionality over the RNC and Node B include requiring multiple (pipelined) staging buffers in the system causing a high end-to-end latency and transmission of packets by the RLC and RRC layer that contain information that may become stale or are superseded by a newer version of the state. For instance, RLC-AM PDUs may contain an acknowledgment state for a peer and RRC messages may contain information for the mobile device to alter the state of the mobile device. A packet or data unit containing the acknowledgment state for the peer and the RRC messages can be referred to as 'timely-data.'

Timely-data is defined as data used for, or incorporated into, data transmissions over a communications system and has a value associated with a best performance of the communications system that decreases with time. Thus, if a message containing timely-data is delayed, the information contained in the message may become obsolete and the usefulness of the message, when received, will become less. An example of timely-data is data pertaining to which packets were received (and, by implication, which packets were not received) by a protocol entity. When such packet-received data is delayed while new packets arrive, the correctness of the packet-received data, and thus its usefulness, will diminish.

When timely-data is queued inside the Node B on a bearer, as can happen if the RNC has overestimated the outflow rate from the Node B for regular circuits, or when the Node B simply does not consider a mobile for transmission in HSDPA mode, a newer version of the timely-data may be queued behind the original transmission. This phenomenon wastes bandwidth, or worse older packets may contain instructions for the mobile device that may already have been retracted by a newer version of the timely-data message. A provision in HSDPA enables packets to be removed from the transmission queue after their lifetime has expired. Unfortunately, this provision breaks RLC-AM since the RLC protocol assumes every packet sent by an RLC-AM layer is received by the peer RLC-AM layer.

Another problem associated with dividing the functionality of the protocol stack over the RNC and Node B includes losing a data packet in the system. In case there is a data packet loss in the system (i.e., when the mobile suffers from a fade in HSDPA), compression engines in the PDCP layer may need to be reset. Since there is no interface provision between the Node B and the RNC to indicate packet loss at the MAC-HS layer, resynchronization by the PDCP sender is performed after receiving an indication for resynchronization from the PDCP receiver. This can result in a considerable time-lag between the packet drop and resynchronization. While the sender is not resynchronized, all data packets that are in flight cannot be successfully decoded resulting in wasting of wireless bandwidth.

Furthermore, when an RLC Acknowledged Mode (RLC-AM) is used, data packet loss at the HSDPA layer needs to be detected at the RLC-AM receiver so that the RLC-AM transmitter can retransmit the lost packet. Typically, a RLC-AM receiver detects the data packet loss by receiving a subsequent data packet if one exists or by timing out on a periodic timer. The receiver then sends a status message to the RLC-AM transmitter, informing the transmitter of the lost packets. This scheme introduces a delay between the time of packet loss and the retransmission of the packet in RLC-AM. The delay is usually a round trip time but can be at most the value of the periodic timer (if the lost packet is the last in a sequence).

Accordingly, what is needed is a system or method for improving the communication of data in a communications system for mobile devices. More specifically, what is needed in the art is an improved system and method for transmitting data packets to mobile devices.

SUMMARY OF THE INVENTION

To address the above-discussed deficiencies of the prior art, the present invention provides integrated base stations (for example, integrated UTRANs), and a method of transmitting data units in a communications system for mobile devices. In one embodiment, the integrated base station includes a communications processor having a protocol stack configured with a media access control layer and a physical layer.

In another aspect, the present invention provides another integrated base station for use in a communications system for mobile devices including a communications processor having a protocol stack implemented in a single processing entity and configured to produce data units suitable for direct transmission between the core network and a mobile device.

For purpose of the present invention, direct transmission shall mean buffering data units received from the core network to match a difference in transmission speed of the core network and a wireless channel and preparing the data units for transmission over the wireless channel to a mobile device when the wireless channel becomes available for transmission. Direct transmission, therefore, allows transmitting a data unit between the core network and the mobile device via a single processing entity. Thus, unlike present mobile communications systems, a controller and base station are not required. For example, in UMTS, a separate RNC and a Node B are not required and in a CDMA2000 system, a separate RNC and a base station are not required. Instead, the novel integrated base station provides the proper protocols needed for communicating between the wired and wireless domains.

Additionally, a data unit is defined for purposes of the present invention as a general term referring to data that includes a payload and associated headers or footers. In some communications systems, the data unit may be known as, for example, a packet (i.e., in UMTS) or a frame.

Thus, considering a UMTS for example, the present invention collapses the functionality of an RNC and a Node B into a single processing entity. The novel integrated base station allows PDCP, RLC and MAC (also, possibly MAC-HS) to be executed on a single machine. Since the protocol layers execute on a single machine, inter-layer optimizations that can dramatically improve the performance of the protocol stacks may be realized. One specialization of this combining is to execute the protocol stacks inside a single process on the integrated base station to ease implementation of the optimizations and to minimize the number of staging buffers between the protocol layers.

In one embodiment, each radio bearer contains one buffer for data units, which resides between an IP and a PDCP layer. Thus, the buffer is located above the PDCP layer in UMTS or above the PPP layer when considering a CDMA2000 system. This buffer matches the speed differences between wired communication links and wireless channels and, more importantly, allows optimization of radio transmission chains as compared to a multi-buffer, multi-system solution typically deployed in a conventional UMTS. The single buffer may only buffer IP packets that are destined for a particular mobile device and allows the transmission of timed-data when needed.

In yet another aspect, the present invention provides, for use with a communications system for mobile devices, a method of transmitting data units between a core network and a mobile device including: (1) receiving data units at an integrated base station from either said core network or said mobile device, (2) providing said data units with required protocols at said integrated base station for direct transmission between said core network and said mobile device and (3) transmitting said data units having said required protocols to said core network or said mobile device.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. For example, the discussion regarding UMTS also applies to other cellular communications systems, such as, CDMA2000. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
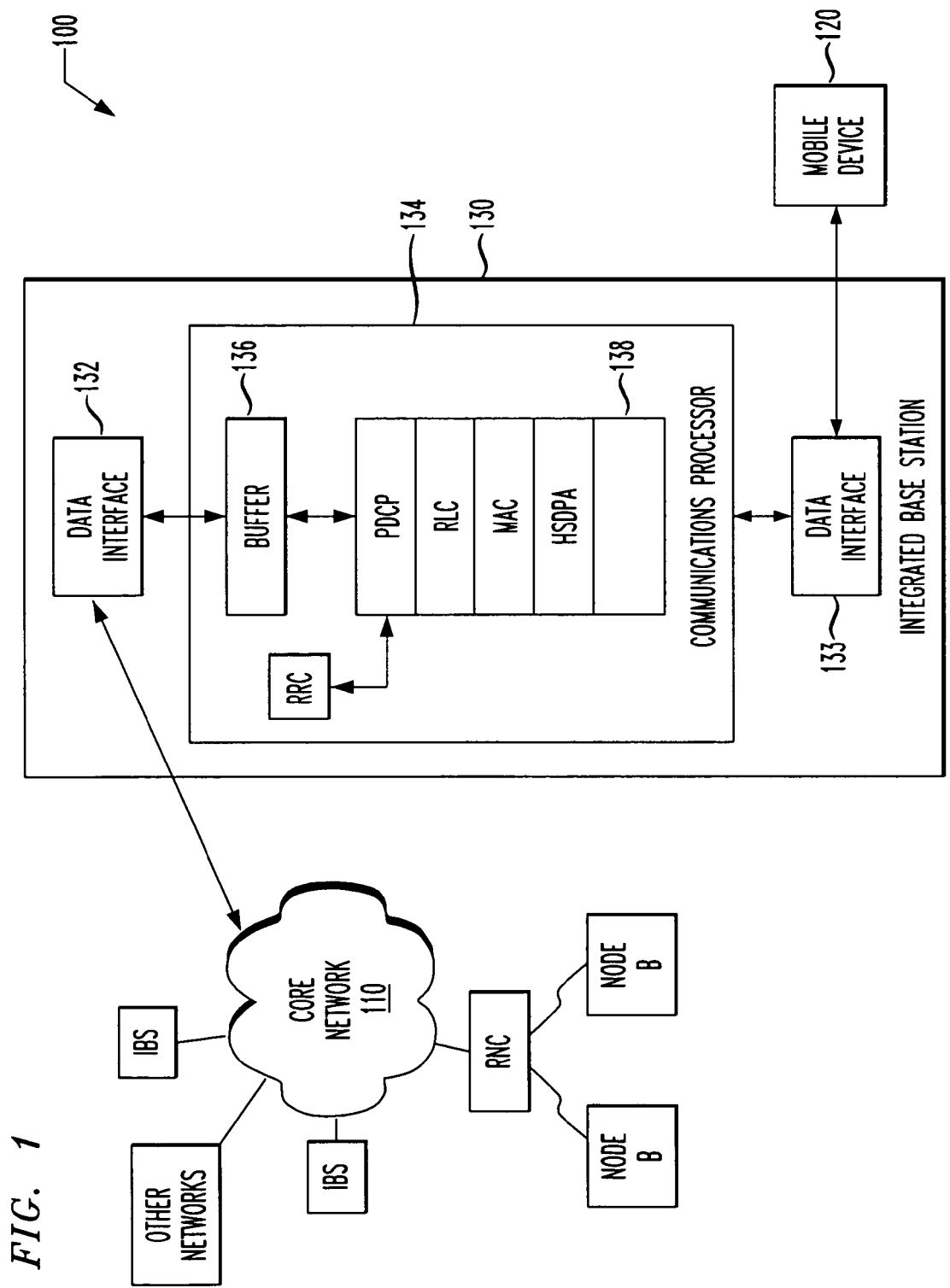
FIG. 1 illustrates a block diagram of one embodiment of a communications system for mobile devices including an integrated base station constructed according to the principles of the present invention.

Referring initially to FIG. 1, illustrated is a block diagram of one embodiment of a cellular communications system for mobile devices, generally designated 100, including an integrated base station 130 constructed according to the principles of the present invention. The communications system 100 also includes a core network 110 and a mobile device 120.

The communications system 100 may be a conventional communications system such as a UMTS having multiple communications nodes coupled through wireless or wired mediums. Of course, the communications system 100 may be another type of communications system, such as, a Global System for Mobile Communications (GSM). Thus, one skilled in the art will understand that the discussion regarding a UMTS also applies to other cellular communications systems and components. For ease of discussion, the integrated base station 130 is representative of the other integrated base stations that are illustrated. One skilled in the art will also understand that the communications system 100 may include additional components or systems that are not illustrated or discussed but are typically employed in a conventional communications system.

The core network 110 may be a conventional core network configured to handle voice and (IP) back-haul issues. The core network 110 consists of communication nodes or switches coupled via connecting lines. As illustrated, the core network 110 connects the integrated base station 130 to other integrated base stations and conventional RNCs and Node Bs. Additionally, the core network 110 can provide gateways to other networks (ISDN, Internet, etc.).

The mobile device 120 may be a conventional cellular telephone configured to operate in the communications system 100. Thus, the mobile device 120 may be a UMTS enabled cellular telephone. One skilled in the art will also understand that the mobile device 120 may also be another wireless device that is configured to operate in the communications system 100, such as, a personal digital assistant (PDA), an MP3 player, etc.

The integrated base station 130 is coupled to the core network 110 via a wired connection and to the mobile device 120 via a wireless connection. The integrated base station 130 is advantageously configured to include the functionality of a conventional RNC and a conventional Node B in a single processing entity. The integrated base station 130 includes a first data interface 132, a second data interface 133 and a communications processor 134 having a protocol stack 136, a buffer 138 and a Radio Resource Control (RRC) layer. One skilled in the art will understand that the integrated base station 130 includes additional components or features that are not material to the present invention but are typically employed in a conventional RNC or Node B to transmit data units between a core network and a mobile device.

The first data interface 132 is configured to transmit and receive data units from the core network 110 and the second data interface 133 is configured to transmit and receive data units from the mobile device 120. The first data interface 132 includes conventional components to transmit and receive data units over a wired connection to the core network 110 and the second data interface includes conventional components to transmit and receive data units over a wireless connection to the mobile device 120. One skilled in the art will understand the operation and configuration of the first data interface 132 and the second data interface 133.

The communications processor 134 is configured to process data units from the first data interface 132 and the second data interface 133. The buffer 136 is configured to queue data units from the core network 110 for the protocol stack 138. In FIG. 1, the buffer 136 is located on top of the protocol stack 138.

The protocol stack 138 is configured to produce data units suitable for direct transmission to the mobile device 120. Thus, the protocol stack 138 provides a single location that receives data units from the core network 110 and transmits the data units with the proper protocols to the mobile device 120. The protocol stack 138 includes a Packet Data Convergence Protocol (PDCP) layer, a Radio Link Control (RLC) layer, a Media Access Control (MAC) layer, and a High Speed Downlink Packet Access (HPSPA) layer. Of course, one skilled in the art will understand that the protocol stack 138 may include other or additional protocol layers in other embodiments. In some embodiments, the HPSPA layer may not be included in the protocol stack 138. Additionally, considering a CDMA2000 system, the protocol stack 138 may be extended to include such layer-2 protocol functionality as point-to-point protocol (PPP) layer and radio link protocol (RLP) layer instead of the PDCP layer and the RLC layer that is associated with a UMTS.

Due to the convergence of the protocol stack 138 into one program, inter layer optimization can occur. For example, the RLC and the RRC layers are configured to generate timed-data for the data units based on when the mobile device is selected for transmission thereto. With only a single queue and a collapsed protocol stack 138, transmission data units can now be 'pulled' from the data queue whenever the base station decides to transmit a data unit to a particular mobile device. For scheduled wireless channels (i.e., HSDPA), this enables timely-data to be created only when a particular mobile is addressed. This means that the transmission always contains the most recent information available and leads to a more efficient use of bandwidth and a more responsive communications system 100.

Further optimization is realized with the protocol stack 138 configured to recognize when a data unit processed by the protocol stack 138 is lost during transmission to the mobile device 120 without input from the mobile device 120. If there is a data unit transmission error (in HSDPA), the HSDPA layer in the integrated base station 130 can inform the RLC-AM layer of this event. Henceforth, the RLC-AM layer can immediately reinitiate the transmission of the lost data unit instead of waiting for a status report or negative acknowledgement from the mobile device 120. The RLC-AM layer can also determine not to retransmit the data unit when otherwise the data unit would have been retransmitted.

Additionally, if there is a data unit transmission error (in for example, HSDPA), the collapsed structure of the protocol stack 138 and the single buffer 136 allows the PDCP compression state to be more easily reset. The integrated base station 130, therefore, can determine an unsuccessful transmission of a data unit and allow the PDCP layer to reset the protocol state of all affected radio bearers. For example, the protocol state may be reset to a well-known state or to an initial state.

Thus, upon recognizing a data unit is lost, appropriate protocol layers of the protocol stack 138 may be notified and appropriate actions may be performed. In addition to resetting protocol states, the novel integrated base station 130 allows changing protocol state variables. Changing protocol state variables may include performing actions associated therewith including: enabling/disabling data compression, enabling/disabling header compression, transmitting/retransmitting certain data units, refraining from transmitting/retransmitting certain data units, notifying a peer protocol entity, and modifying behavior of a timer. By recognizing a transmission failure and acting appropriately, the present invention allows the higher layer applications to recover sooner from losses of data units and can reduce transmission of undecodable data units.

Figure 2:
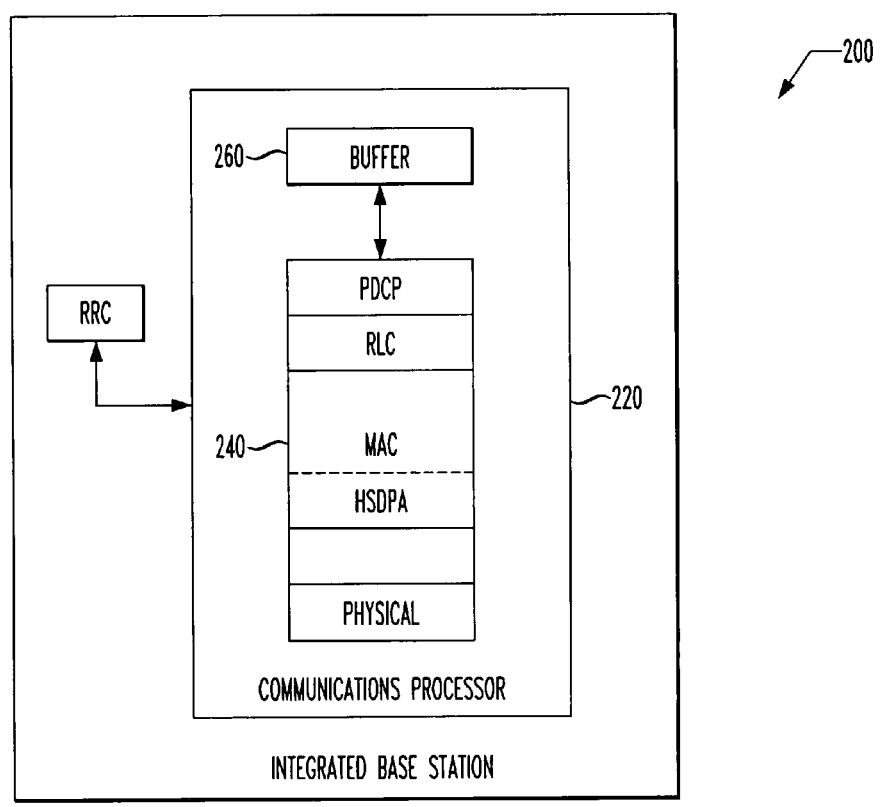
FIG. 2 illustrates a block diagram of another embodiment of an integrated base station constructed according to the principles of the present invention.

Turning now to FIG. 2, illustrated is a block diagram of one embodiment of an integrated base station, generally designated 200, constructed according to the principles of the present invention. The integrated base station 200 includes a Radio Resource Control (RRC) layer and a communications processor 220 having a protocol stack 240 and a buffer 260. Of course, as illustrated in FIG. 1, the RRC layer can be included within a communications processor in some embodiments.

The communications processor 220 is configured to process data units received over a communications network for mobile devices. More specifically, the communications processor 220 is configured to provide the needed protocols for transmitting a data unit between a core network and a mobile device. One skilled in the art will understand that the communications processor 220 includes additional components that are not material to the invention and are not illustrated or discussed.

The protocol stack 240 includes a PDCP layer, a RLC layer, a MAC layer and a physical layer. Integrated within the MAC layer is the functionality of a HSDPA layer. Thus, the MAC layer is configured to perform independent transmission decisions based on channel conditions to a wireless device. Of course, as illustrated in FIG. 1, a HSDPA layer can interpose the MAC layer and the physical layer. Additionally, in other cellular communications systems, the MAC layer may have other packet schedule modes integrated therein. For example, in a CDMA2000 system, the MAC layer may include the functionality of a DO or DV layer.

The buffer 260 may be a conventional buffer configured to queue data units between a wired and wireless channel. The buffer 260 is located on top of the protocol stack 240. Locating the buffer 260 above the PDCP layer allows the buffer 260 to queue uncompressed data units. If the buffer 260 is located in other locations, restarting a PDCP resynchronization procedure is more difficult. Thus, the buffer 260 resides between the IP and PDCP layers to provide a single queue for data units. The buffer 260 is configured to match speed differences between the wired and wireless domains, but more importantly allows unique optimization of radio transmission chains and provides distinct advantages over a multi-buffer, multi-system solution as deployed in a conventional UMTS without an integrated base station of the present invention.

Additionally, end-to-end latencies are reduced since there is no staging of data through multiple queues. In a regular UTRAN, data units are delayed as they are staged through the various buffers in the UTRAN components before they are transmitted over a wireless channel. However, in a single-machine, single-buffer system of the present invention, a data unit may only be delayed by the time it is queued in the single buffer 260. There is no staging time for a data unit to traverse a number of queues.

With only a single queue and a collapsed stack, transmission data units can now be 'pulled' from the buffer 260 whenever the integrated base station 200 decides to transmit a data unit to a particular mobile device. For scheduled wireless channels (i.e., HSDPA), this enables timely-data to be created only when a particular mobile device is addressed. This means that the transmission always contains the most recent information available and leads to a more efficient use of bandwidth and a more responsive mobile communications system.

Thus, when a mobile device is selected for data transmission, precisely enough, where enough depends on the wireless channel conditions and coding schemes, data units are pulled from the single data buffer 260. At this particular instance, the MAC, RLC and PDCP stack is executed for the radio bearer and at this particular instance RRC and RLC state information is generated. When needed, the data units are header compressed in the PDCP layer. Since timely-data is only generated at the latest possible instance, the timely-data cannot become stale or be superseded by a newer version.

The integrated base station 200 may employ RLC-UM or RLC-AM when transmitting data units. When employing RLC-UM for communication, a MAC-HS layer notifies the compression layer (PDCP) when a data unit is lost in the downlink. The PDCP, therefore, can reset its internal compression schemes and resynchronize with a remote peer. The latter implies that resynchronizing the compression state is performed much sooner and does not require the receiver to signal the sender of a lost data unit. When employing RLC-AM for communication, the PDCP layer does not need to reset if a data unit is dropped. Instead, the HSDPA layer notifies the RLC-AM layer of this event and the RLC-AM layer can retransmit the data unit without waiting for a status message from the mobile device.

Figure 3:
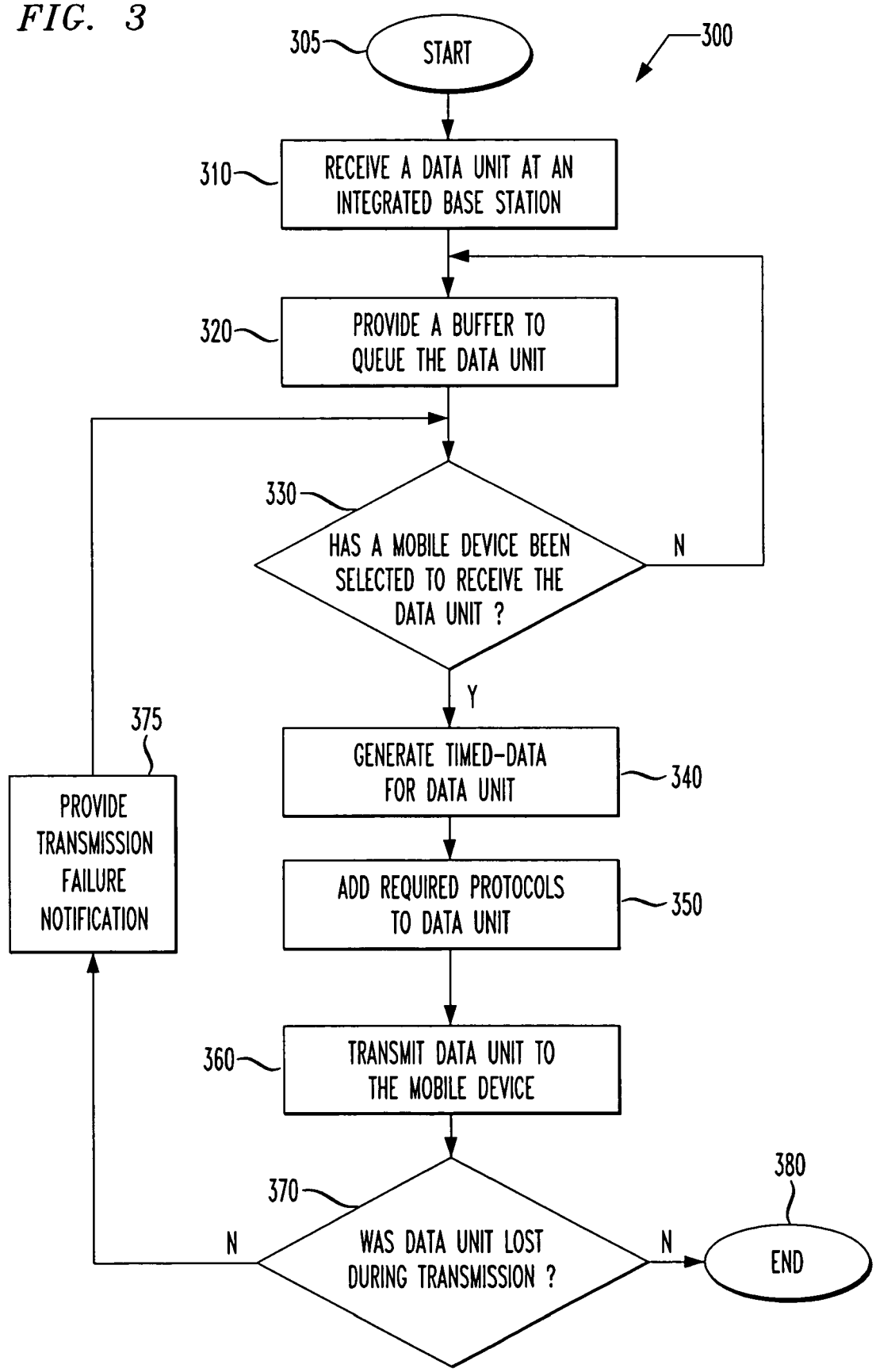
FIG. 3 illustrates a flow diagram of an embodiment of a method of transmitting data units between a core network and a mobile device carried out according to the principles of the present invention.

Turning now to FIG. 3, illustrated is a flow diagram of an embodiment of a method of transmitting data units between a core network and a mobile device, generally designated 300, carried out according to the principles of the present invention. The method begins with an intent to transmit a data unit to a mobile device in a step 305.

After beginning, a data unit is received at an integrated base station from a core network in a step 310. The data unit is received via a wired connection.

After the data unit is received, a buffer is provided to queue the data unit between the core network and the mobile device in a step 320. The buffer is advantageously provided on top of a protocol stack that is employed to process the data unit.

After providing the buffer, a determination is then made if a mobile device has been selected to receive the data unit in a decisional step 330. If a mobile device has been selected, then timed-data is generated for the data unit in a step 340. If a mobile device has not been selected, the method returns to step 320.

After generating the timed-data, required protocols are added to the data unit in a step 350. The required protocols are those needed for direct transmission between the core network and the mobile device. Typically, the required protocols are provided by a protocol stack of an integrated base station. In one embodiment, the required protocols are provided by a PDCP layer, a RLC layer and a MAC layer.

After providing the required protocols, the data unit is transmitted with the required protocols to the mobile device in a step 360.

The method 300 then determines if the packet was lost during transmission in a second decisional step 370. If the packet was lost, the method continues to a step 375 that provides a transmission failure notification. When timed-data is lost, the next higher layer is notified. If the notified layer cannot solve the transmission problem (perform an appropriate action to solve), the next higher layer is notified. Thus, each layer that does not solve the dropped packet event notifies the layer above it of the event. After providing the transmission failure notification, the method returns to step 330 and continues. If the data unit was not lost, the method ends in a step 380.

Although the present invention has been described in detail, those skilled in the art should understand that they can make various changes, substitutions and alterations herein without departing from the spirit and scope of the invention in its broadest form.

What is claimed is:

1. For use in a cellular communications network for mobile devices, an integrated base station, comprising:
   a communications processor including:
      a protocol stack configured with:
         a media access control layer,
         a packet data convergence protocol layer and a radio link control layer, both layers above said media access control layer, and
         a physical layer,
      a single buffer associated with and located on top of said protocol stack; and
      a radio resource control (RRC) layer, wherein said protocol stack, single buffer, and RRC layer in said communications processor allow for older transmission data units to be pulled from data in said single buffer when newer transmission data units are transmitted.

2. The integrated base station as recited in claim 1 wherein said protocol stack is configured to generate timely-data for at least one of said data units based on when a mobile device is selected for transmission thereto.

3. The integrated base station as recited in claim 1 wherein said protocol stack is configured to only generate timely-data for at least one of said data units when a mobile device is selected for transmission thereto.

4. The integrated base station as recited in claim 1 wherein said at least one protocol layer is configured to notify a protocol layer above said media access layer when a data unit processed by said protocol stack is lost during transmission to a wireless device.

5. The integrated base station as recited in claim 1 further including at least one protocol layer interposing said media access control layer and said physical layer.

6. The integrated base station as recited in claim 5 wherein said at least one protocol layer is a High Speed Downlink Packet Access layer.

7. The integrated base station as recited in claim 5 wherein said at least one protocol layer is configured to provide packet schedule functionality for wireless transmission to a mobile device.

8. The integrated base station as recited in claim 5 wherein said at least one protocol layer is configured to recognize transmission failure of a data unit processed by said protocol stack.

9. The integrated base station as recited in claim 8 wherein said at least one protocol layer is configured to notify at least one other protocol layer of said transmission failure upon said recognizing and said other protocol layer is configured to perform appropriate actions upon said notification.

10. The integrated base station as recited in claim 9 wherein said appropriate actions are selected from the group consisting of:
   changing a protocol state variable,
   resetting a protocol state to an initial state, and
   resetting a protocol state to a well known protocol state.

11. The integrated base station as recited in claim 10 wherein said changing a protocol state variable includes performing an action selected from the group consisting of:
   enabling data compression,
   disabling data compression,
   enabling header compression,
   disabling header compression,
   transmitting certain data units,
   retransmitting certain data units,
   refraining from transmitting certain data units,
   refraining from retransmitting certain data units,
   notifying a peer protocol entity, and
   modifying behavior of a timer.

12. An integrated base station for use with cellular communications systems for mobile devices having a core network, comprising:
   a communications processor having:
      a protocol stack implemented in a single processing entity and configured to produce data units suitable for direct transmission between said core network and a mobile device;
      a single buffer located on top of said protocol stack and configured to queue data units for said protocol stack; and
      a radio resource control (RRC) layer, wherein said protocol stack, single buffer, and RRC layer in said communication processor allow for older transmission data units to be pulled from data in said single buffer when newer transmission data units are transmitted.

13. The integrated base station as recited in claim 12 wherein said protocol stack includes a layer configured to generate timed-data for at least one of said data units based on when said mobile device is selected for transmission thereto.

14. The integrated base station as recited in claim 12 wherein said protocol layer is configured to recognize when a data unit processed by said protocol stack is lost during transmission to said mobile device without input from said mobile device.

15. The integrated base station as recited in claim 12 wherein said protocol stack includes each of the following layers:
   a packet data convergence protocol layer,
   a radio link control layer,
   a media access control layer, and
   a physical layer.

16. The integrated base station as recited in claim 12 wherein said communications system is selected from the group consisting of:
   a Universal Mobile Telecommunications System, and
   a Code Division Multiple Access 2000 system.

17. The integrated base station as recited in claim 12 wherein said protocol stack includes a media access control layer configured to perform independent transmission decisions based on channel conditions to a wireless device.

18. In a communications system for mobile device, a method of transmitting data units between a core network and a mobile device, comprising:
   receiving a data unit at an integrated base station from either said core network or said mobile device;
   queuing said data unit between said core network and said mobile device in a single buffer on top of a protocol stack;
   providing said data unit with required protocols at said integrated base station for direct transmission between said core network and said mobile device;
   controlling said required protocols with a radio resource control (RRC) layer;
   transmitting said data unit having said required protocols to said core network or said mobile device; and
   allowing older transmission data units to be pulled from said single buffer when newer transmission data units are transmitted.

19. The method as recited in claim 18 further comprising generating timed-data for said data unit based on when said mobile device is selected for transmission thereto.

20. The method as recited in claim 18 further comprising recognizing when said data unit is lost during transmission to said mobile device without input from said mobile device.

21. The method as recited in claim 20 further comprising resetting an internal protocol state upon said recognizing.

22. The method as recited in claim 20 further comprising retransmitting said data unit upon said recognizing.

23. The method as recited in claim 22 wherein said required protocols are provided by each of the following layers:
   a packet data convergence protocol layer,
   a radio link control layer,
   a media access control layer, and
   a physical layer.

* * * * *

UNITED STATES PATENT AND TRADEMARK OFFICE
CERTIFICATE OF CORRECTION

PATENT NO.      : 7,580,385 B2
APPLICATION NO. : 11/047038
DATED           : August 25, 2009
INVENTOR(S)     : Bosch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Fourteenth Day of September, 2010

David J. Kappos
*Director of the United States Patent and Trademark Office*